(12) United States Patent
Menor (10) Patent No.: US 8,888,141 B2
(45) Date of Patent: Nov. 18, 2014

(54) FLUID COUPLING ASSEMBLY AND METHOD OF MANUFACTURE

(75) Inventor: Eric D. Menor, Marinette, WI (US)

(73) Assignee: Caterpillar Inc., Peoria, IL (US)

( * ) Notice: Subject to any disclaimer, the term of this patent is extended or adjusted under 35 U.S.C. 154(b) by 765 days.

(21) Appl. No.: 12/609,525

(22) Filed: Oct. 30, 2009

(65) Prior Publication Data

US 2011/0101680 A1    May 5, 2011

(51) Int. Cl.
*F16L 33/00*    (2006.01)

(52) U.S. Cl.
USPC .......................................... 285/256; 285/242

(58) Field of Classification Search
USPC ............ 285/238, 256, 242, 259, 222.1–222.5
See application file for complete search history.

(56) References Cited

U.S. PATENT DOCUMENTS

| | | | | |
|---|---|---|---|---|
| 1,778,244 A * | 10/1930 | Cadden | ............................ | 29/508 |
| 2,278,239 A | 3/1942 | Butler | | |
| 2,314,000 A | 3/1943 | Lusher et al. | | |
| 2,479,499 A * | 8/1949 | Le Clair | ........................ | 285/256 |
| 2,661,225 A | 12/1953 | Lyon | | |
| 2,797,111 A | 6/1957 | Beazley | | |
| 2,865,094 A * | 12/1958 | Press | ............................... | 29/506 |
| 3,347,571 A * | 10/1967 | New | ........................... | 285/222.4 |
| 3,423,109 A * | 1/1969 | New et al. | ................... | 285/222.1 |
| 3,539,207 A * | 11/1970 | Harris | ........................... | 285/256 |
| 3,711,131 A * | 1/1973 | Evans | ........................... | 285/256 |
| 3,990,728 A | 11/1976 | Coughlin | | |
| 4,106,526 A * | 8/1978 | Szentmihaly | ................. | 138/109 |
| 4,366,841 A | 1/1983 | Currie et al. | | |
| 4,369,992 A * | 1/1983 | Fournier et al. | ............... | 285/256 |
| 4,564,223 A | 1/1986 | Burrington | | |
| 4,569,541 A * | 2/1986 | Eisenzimmer | ............. | 285/222.1 |
| 4,653,779 A * | 3/1987 | Foster | ........................... | 285/256 |
| 4,684,157 A * | 8/1987 | Smith | ........................... | 285/256 |
| 5,190,323 A * | 3/1993 | Oetiker | .......................... | 285/39 |
| 5,255,944 A * | 10/1993 | Blin et al. | .................. | 285/222.2 |
| 5,288,112 A * | 2/1994 | Shiery | ........................... | 285/256 |
| 5,419,028 A | 5/1995 | Manning et al. | | |
| 5,487,570 A | 1/1996 | Wilson | | |
| 5,799,383 A | 9/1998 | Baldwin et al. | | |
| 6,386,594 B1 * | 5/2002 | Schuttler et al. | .............. | 285/251 |

(Continued)

FOREIGN PATENT DOCUMENTS

| | | | | |
|---|---|---|---|---|
| CN | 1719088 | 1/2006 | | |
| DE | 3243365 A1 * | 5/1984 | ............. | F16L 33/20 |

(Continued)

*Primary Examiner* — Aaron Dunwoody
(74) *Attorney, Agent, or Firm* — Miller, Matthias & Hull (57) ABSTRACT

A coupling assembly for use with a wire-reinforced elastomeric hose member includes a stem member defining at least one groove and the groove includes first and second walls, a bottom portion and a pair of shoulder portions separated by a width and a shell member at least partially enclosing said stem member and defining at least one axially extending barb member. The barb member includes a tip portion having first and second edge portions. The tip of the barb member is sized relative to the shoulders in said groove to transfer force developed by deflection of the reinforcement wire to compress a liner of the hose at the shoulders through the barb edge portions corresponding to a swaged state of the shell and stem members.

9 Claims, 6 Drawing Sheets (56) References Cited

U.S. PATENT DOCUMENTS

| | | |
|---|---|---|
| 6,447,017 B1 | 9/2002 | Gilbreath et al. |
| 7,014,218 B2 | 3/2006 | Fisher et al. |
| 7,338,090 B2 | 3/2008 | Baldwin et al. |
| 7,624,504 B2 * | 12/2009 | Watanabe ............... 29/890.144 |
| 2003/0205898 A1 * | 11/2003 | Baldwin et al. ............... 285/256 |
| 2004/0032124 A1 * | 2/2004 | Lefere et al. ............... 285/242 |
| 2005/0001424 A1 * | 1/2005 | Watanabe ............... 285/256 |
| 2006/0071469 A1 * | 4/2006 | Romanelli et al. ............... 285/256 |
| 2007/0079885 A1 * | 4/2007 | Zaborszki et al. ............ 138/121 |
| 2007/0096461 A1 * | 5/2007 | Owens ............... 285/256 |
| 2008/0185840 A1 * | 8/2008 | Menor ............... 285/256 |
| 2008/0302467 A1 | 12/2008 | Mukawa et al. |
| 2011/0309613 A1 * | 12/2011 | Trujillo et al. ............... 285/256 |

FOREIGN PATENT DOCUMENTS

| | | | |
|---|---|---|---|
| DE | 3529889 A1 * | 3/1987 | .............. F16L 33/20 |
| EP | 3142 A2 * | 7/1979 | .............. F16L 33/20 |
| EP | 573908 A1 * | 12/1993 | ............ F16L 33/207 |
| FR | 2594205 A1 * | 8/1987 | ............ F16L 33/207 |
| GB | 2220242 A * | 1/1990 | .............. F16L 33/20 |
| JP | 63-103089 | 7/1988 | |
| JP | 02118297 A * | 5/1990 | .............. F16L 33/20 |
| JP | 04337187 A * | 11/1992 | .............. F16L 33/20 |
| JP | 2003278975 | 10/2003 | |
| JP | 2004204878 | 7/2004 | |
| JP | 2006300148 | 11/2006 | |
| WO | WO 9413994 A1 * | 6/1994 | .............. F16L 33/00 |
| WO | WO 9418487 A1 * | 8/1994 | ............ F16L 33/207 |

* cited by examiner

FLUID COUPLING ASSEMBLY AND METHOD OF MANUFACTURE

TECHNICAL FIELD

The present disclosure relates generally to fluid coupling construction and manufacturing, and more particularly to the same as it relates to hydraulic coupling assemblies used for fluid connectivity through a reinforced hose.

BACKGROUND

Fluid couplings are commonly used in concert with flexible, elastomeric hoses to communicate fluid pressure between locales or to fluidly connect sources for the purpose of transporting fluid therebetween. Fluid couplings have broad utility across many industries relating to a wide variety of applications. Such couplings—typically connected by a flexible conduit or hose to form a hose assembly—are particularly useful in applications where one source may be moveable, or subject to vibration relative to another portion of a system, and where rigidly connected conduits may be compromised by such movement or vibration. Hose assemblies are commonly found in mobile machinery, electric power, refinery, mining and construction equipment industries. The equipment used in these industries often includes multiple instances where hose assemblies are employed to transport fluid (gaseous or liquid) commonly under high pressure and elevated temperature. Common examples of hose assembly usage in the mobile machinery and electric power industries include: connecting a high pressure hydraulic fluid source to pressure cylinders to animate implements, transporting fuel from a source to a fuel system within a combustion engine, communicating lubrication oil from a supply to moving or engaging parts such as, for example, gears in a transmission, transporting coolant from a source to a heat transfer element such as a radiator to cool the fluid and communicating fluid between pump/motor assemblies to transform fluid pressure to rotary motion.

A common form of fluid coupling includes a metallic stem portion which is structured to receive an end of a flexible elastomeric hydraulic hose and a metallic shell portion, which surrounds the hose, has inwardly directed barbs and is structured to provide a tight collar vis-à-vis the hose portion sandwiched between the stem and shell.

Although not part of the fluid coupling assembly, the hose is an element of the completed hose assembly and is commonly reinforced with a metallic wire weave or winding sandwiched between an inner elastomeric liner in concentric relation with an outer elastomeric cover portion to form a hose that is constructed to withstand high temperature and pressure application. A hard plastic sheath, overlaying and encasing the outer cover portion of the hose, may be provided to reduce damage caused by impact and abrasion related contact to the hose.

A common method to permanently affix the hose end with the coupling entails sliding the hose onto the stem of the coupling and thereafter deforming the metallic shell portion of the coupling via dies on a hydraulic press, for example, in order for the barbs of the shell to concentrically crush the hose between the shell and stem. This process is commonly referred to as "crimping" or "swaging". There are two common types of couplings termed "skive" and "no-skive" couplings. As it relates to the skive coupling, the coupling assembly is not structured to address the cover of the hose. Therefore, the cover, including the outer abrasion resistant sheath if one exists, must be removed prior to the swaging operation to ensure that the barbs within the shell provide an adequate measure of compression to the reinforcement wire and the liner of the hose. As it relates to the non-skive coupling, the coupling assembly is structured to address (e.g., penetrate) the cover of the hose, thus little if any preparation to the hose is required and the cover does not need to be removed prior to the swaging operation. The barbs of the non-skive coupling are structured to penetrate the cover to provide a sufficient measure of compression to the reinforcement wire and the liner in sealing the liner with the stem. Non-skive couplings are typically preferable because the additional steps to remove the cover add expense and difficulty to the assembly process.

Unfortunately, hose assemblies heretofore utilizing swaged couplings may be subject to leakage and shortened life due to "over-compression" of the hose liner material in the vicinity of the barb tip. The swaging operation imparts a significant radial load that acts substantially along a circumferential line on the liner. At the site of the liner/barb interface and accompanying liner/stem interface, the elastomeric liner is often subject to complete compression—meaning the liner is completely compressed and is incompressible (e.g., a solid). In this state, the liner has little or no resiliency and as the liner wears any significant temperature or pressure variation may cause the liner to lose its seal with the stem resulting in premature leakage and shortened life. In response to this situation, fluid couplings employ multiple rows of barbs axially spaced within the shell to decrease the likelihood of fluid leaking past the multiple seals in serial arrangement.

As it relates to manufacturing and assembling the coupling assembly with the hose resulting in a finished hose assembly, manufacturers often suggest employing specialized equipment to provide a precisely swaged connection between the coupling assembly and hose. Since the goal in ensuring a fluid tight seal is to compress the hose liner near the barb tip to the point of incompressibility of the hose there is little if any margin for error when the shell of the coupling assembly is undergoing permanent deformation. In fact, near the point that the hose becomes incompressible any additional compression by the swaging device may cause deformation of the shell and stem resulting in scrapped parts, premature leakage or shortened life of the hose assembly at a significant expense. As a result, many hose assemblies are scrapped during the swaging process and it is not uncommon for the hose assembly to leak if the proper equipment has not been employed and proper procedures have not been meticulously followed.

U.S. Pat. No. 6,447,017, to Gilbreath et al. issued Sep. 10, 2002 discloses a fluid coupling assembly employing a stem and shell combination that is swaged to sandwich a reinforced hose member therebetween. The stem is serrated, including a series of spaced grooves and the shell includes a plurality of spaced barbs. Radial displacement of the barb ends, caused by the swaging operation, displaces the reinforcement wire of the hose to substantially compress or "pinch" the liner material against the stem to form a generally circumferentially linear seal directly under each barb. Some barbs are positioned to overlay grooves of the stem and others may be positioned to overlay higher portions or "lands" on the stem. In some instances, the liner directly under each barb is compressed along a circumferential line on the stem to the point it is near "incompressibility" along this line and in other instances the barb may not adequately interact with the groove to provide an adequate seal. The overly compressed liner portions may be subject to premature leakage or shortened life when the liner is subject to natural degradation, thermal cycling or axial movement of the hose relative to the coupling assembly due to pressurization.

A fluid coupling which may overcome one or more of these limitations and one that would be readily manufacturable would be desirable. Furthermore, a non-skive fluid coupling assembly which does not significantly add cost relative to known fluid couplings, and one which may be readily adaptable to available reinforced hose members to form hose assemblies is highly desirable.

SUMMARY OF THE INVENTION

In one aspect, a coupling assembly for use with a wire-reinforced elastomeric hose member having reinforcement wire surrounding an elastomeric liner therein is provided and the coupling assembly comprises: a stem defining at least one groove, the groove includes first and second walls, a bottom portion and a pair of shoulder portions separated by a width. A shell is provided and at least partially encloses the stem and defines at least one barb. The barb includes a tip portion defining first and second edge portions. The tip of the barb is sized relative to the shoulder portions of the groove to transfer force developed by deflection of the reinforcement wire to sealingly compress the liner of the hose between the shoulder portions of the groove and the edge portions of the tip portion of the barb corresponding to a swaged state of the shell and stem members relative to the hose.

In another aspect, a method of manufacturing a coupling assembly for use with a wire-reinforced elastomeric hose having reinforcement wire surrounding an elastomeric liner therein is provided. The coupling assembly comprises a stem defining at least one groove, the groove includes first and second walls, a bottom portion and a pair of shoulder portions separated by a width. The method comprises: providing a shell at least partially enclosing the stem and defining at least one barb. The barb including a tip portion defining first and second edge portions. The tip of the barb being sized relative to the shoulder portions of the groove to transfer force developed by deflection of the reinforcement wire to sealingly compress the liner of the hose between the shoulder portions of the groove and the edge portions of the tip portion of the barb corresponding to a swaged state of the shell and stem members relative the hose. The method also includes attaching the stem to the shell to form a coupling assembly wherein the coupling assembly comprises a size, the barb tip width, the barb height, the barb spacing, the groove width and the groove depth dimensions within dimension ranges provided in Table 1 or Table 2.

In another aspect, a method of manufacturing a hose assembly is provided. The method comprises: providing a wire-reinforced elastomeric hose having reinforcement wire surrounding an elastomeric liner therein, providing a coupling assembly, the coupling assembly comprises: a stem defining at least one groove, the groove including first and second walls, a bottom portion and a pair of shoulder portions separated by a width and a shell at least partially enclosing the stem and defining at least one barb. The barb includes a tip portion defining first and second edge portions. The tip of the barb is sized relative to the shoulder portions of the groove to transfer force developed by deflection of the reinforcement wire to sealingly compress the liner of the hose between the shoulder portions of the groove and the edge portions of the tip portion of the barb corresponding to a swaged state of the shell and stem members relative the hose. The coupling assembly comprises a size, the barb tip width, the barb height, the barb spacing, the groove width and the groove depth dimensions within dimension ranges shown in Table 1 or Table 2. The method also includes joining the hose with the coupling assembly through a swaging operation, wherein a size of the hose assembly and a shell diameter of the shell corresponding to a swaged state of the shell comprises a dimension within the dimension ranges shown in Table 3 or Table 4.

BRIEF DESCRIPTION OF THE DRAWINGS

The accompanying drawings, which are incorporated in and constitute a part of this specification, illustrate an exemplary embodiment of the invention and, together with the description, serve to explain the principles of the invention. In the drawings.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention in one form thereof, and such exemplification is not to be construed as limiting the scope of the invention in any manner.

DETAILED DESCRIPTION

Figure 1:
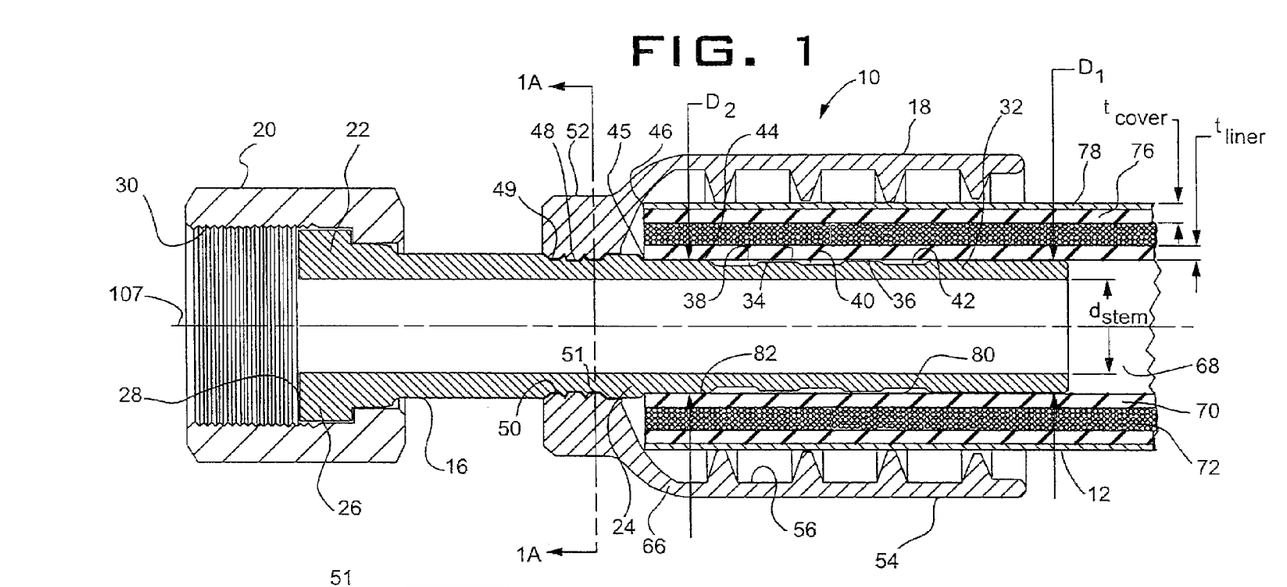
FIG. 1 is a cross-sectional view of a coupling assembly in accordance with the present invention, additionally a sectioned hose is shown and is inserted on the stem in preparation for a permanent assembly operation between the coupling and hose.
Figure 2:
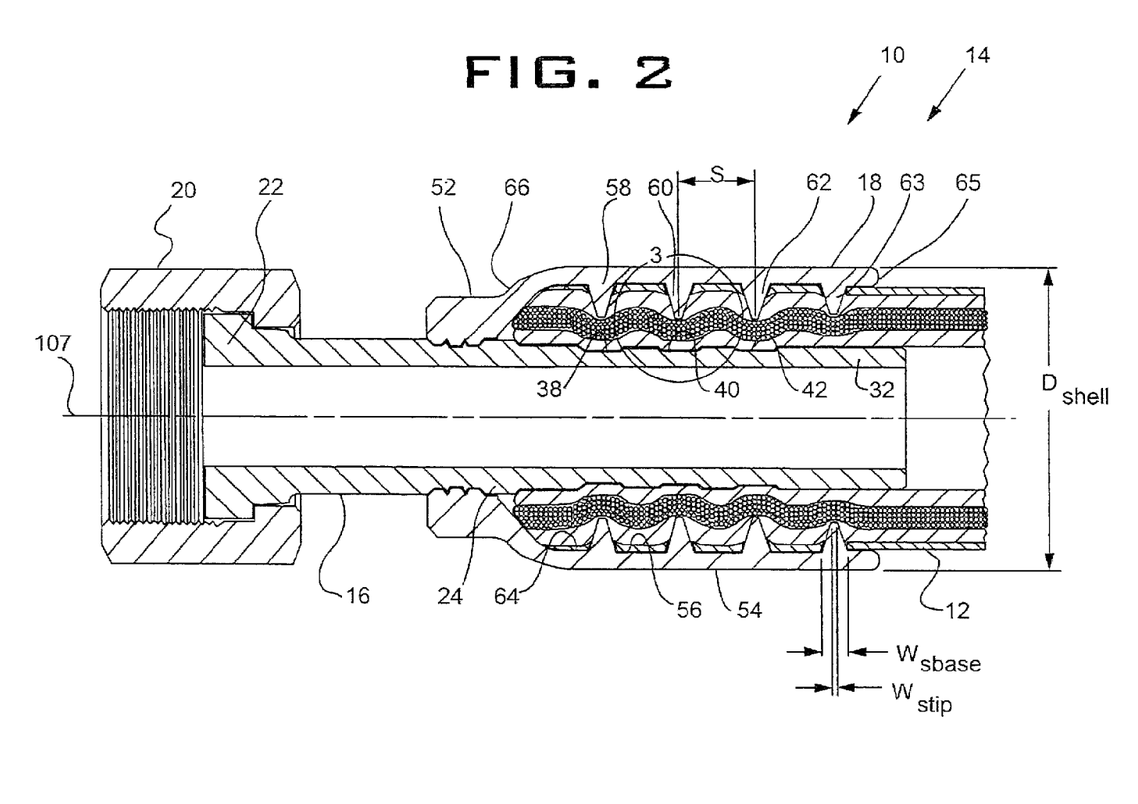
FIG. 2 is the coupling assembly and hose of FIG. 1, permanently joined to form a hose assembly shown subsequent to a permanent assembly operation between the coupling assembly and the hose.

Referring to FIG. 1, coupling assembly 10 includes a tubular stem 16 and a bell-shaped shell 18 which can be combined with hose 12 to create a "fluid-tight" hose assembly 14 (FIG. 2). A first end 22 of stem 16 includes a T-shaped base 26 having a sealing interface 28 which is urged into contact with a complementary sealed nipple (not shown) as is customary when threaded portion 30 of nut 20 is threaded onto such nipple. It is envisioned that the sealing interface 28 of the first end 22 of stem 16 can alternatively include any conventional pipe-end connection such as a male pipe coupling, a JIC 37 degree flare coupling or an angled connection coupling. For example, it is envisioned that at least one type of sealing interface 28 alternative may be a male pipe-thread for example and therefore nut 20 would not be required.

Stem 16 includes a second end 24 which is a hollow nipple portion 32 having an inside diameter, $d_{stem}$ and an outer diameter, D1. The outer diameter D1 may be sized to provide a slight radial clearance fit relative to the inside diameter of the hose 12. Second end 24 of stem 16 includes two lands 34, 36 which are axially separated along stem 12 relative to groove 40. Grooves 38, 42 are positioned outside of, and adjacent, groove 40. A pilot land 44 is positioned about midpoint between first end 22 and second end 24 of stem 16. Pilot land 44 includes diameter D2 which is slightly larger than the inner diameter of hose 12. Positioned adjacent the pilot land 44 is stop 45 formed on stem 16 and is structured to abut an end 46 of hose 12 providing an affirmative stop for hose 12 when hose 12 is being assembled with stem 16.

Stem 16 includes a male engagement portion 48 circumferentially formed on an outer surface 49 of stem 16. Shell 18 includes a female engagement portion 50 formed on an inner bore 51 therein and is constructed to facilitate permanent engagement with the male engagement portion 48 to create a unitary coupling assembly 10. Female engagement portion 50 of shell 18 may be fused with male engagement portion 48 through a swaging operation, an interference fit, welding or brazing or other suitable permanent engagement operation known by those with skill in the art of coupling manufacturing.

Figure 1A:
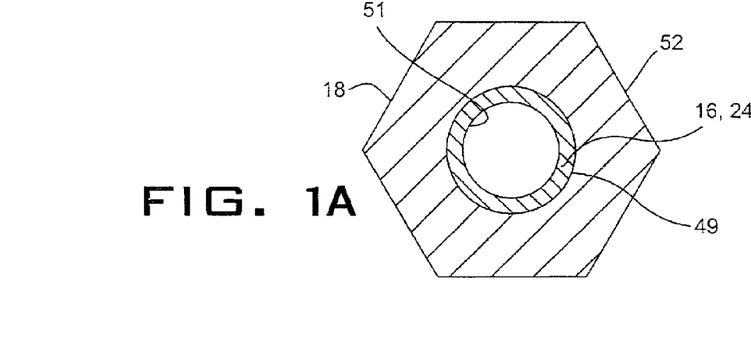
FIG. 1A is a cross-sectional view of the coupling assembly of FIG. 1 taken through line 1A-1A.

Referring to FIG. 2, shell 18 includes a tool portion 52, which may be hexagonally shaped (FIG. 1A), for example, for facilitating engagement with a tool or wrench. For example, as nut 20 on stem is tightened, shell 18 may have a tendency to rotate with stem 16 and in response a wrench may be applied to tool portion 52 of shell 18 to avoid unwarranted twisting of shell 18 and hose 12 which may compromise hose assembly 14. Shell 18 includes a bell-shaped outer surface 54 and a toothed or barbed inner portion 56. Inner portion 56 includes barbs 58, 60 and 62 that respectively align and are centered within grooves 38, 40 and 42. An additional barb or seal barb 63 is located nearest an opening 65 of stem and is arranged to provide an additional seal at the site of the nipple 32 of stem 16 as is described in further detail below. Between barbs 58-60, 60-62 and 62-63 are annular wall portions 64 of shell 18. A sloped end portion 66 of shell 18 is constructed to deform during crimping or swaging of shell 18 in order for barbs 58, 60 and 62 to align and center with respect to grooves 38, 40 and 42. In fact, it may be seen—with reference to FIG. 1—that before the swaging operation, shell 18 has a generally dilated posture, with barbs 58, 60 and 62 not aligning with respect to grooves 38, 40 and 42. In contrast—with reference to FIG. 2—the deformed shell 18 is smaller in diameter and elongated in the "post-swage" condition with barbs 58, 60 and 62 being aligned relative to grooves 38, 40 and 42.

Figure 3:
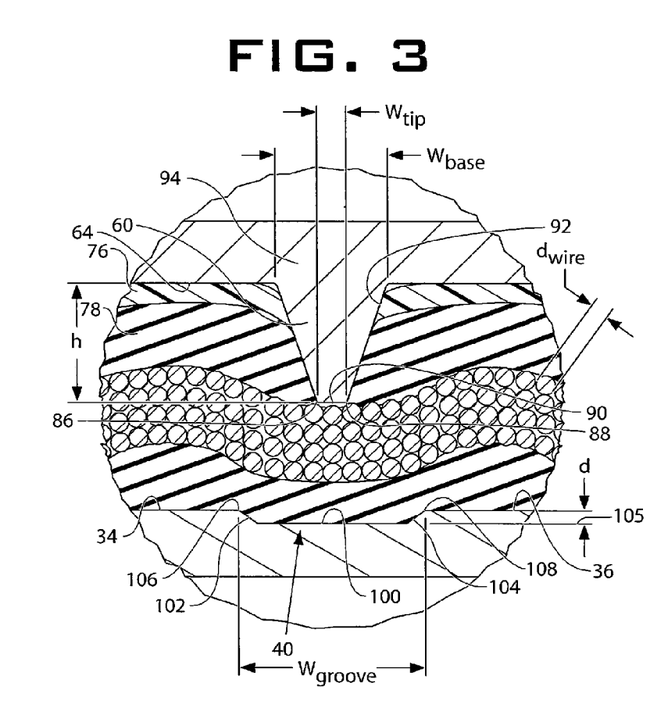
FIG. 3 is an enlarged view of the encircled area 3, shown in FIG. 2.

Referring to FIG. 1, hose 12 includes inner wall 68 which is the portion of hose 12 that is exposed to system fluid when hose assembly 14 (FIG. 2) is in operation. Hose 12 includes liner 70 which is the inner core of hose 12 and is customarily manufactured from a pliable elastomeric material with temperature, pressure and chemical resistant properties contemplated to be compatible with the system fluid and operating conditions. Hose 12 also includes a reinforcement wire layer or "reinforcement wire" 72 comprised of more than one spiral or helically wound layers of wire. The reinforcement wire 72 surrounds and protects the liner 70 and may be manufactured from steel wire, having diameter, $d_{wire}$ (FIG. 3). Regarding the reinforcement wire 72, it may be manufactured from alternating helically wound metallic wire layers with each successive layer being positioned at approximately a 54.7 degree angle relative the layer that it overlays. The number of wire layers of reinforcement wire 72 is typically dependent on the system requirements which specify temperature and pressure parameters. For example, a 6000 psi system fitted with a ⅜" or ½" diameter hose assembly may require the reinforced hose to include 4 layers of wound wire (as shown) having wire diameter, $d_{wire}$ of 0.30 mm, for example. Hose 12 also includes a cover layer or "cover" 74 which comprises an inner portion 78 and a thin sheath 76. Sheath 76 of cover 74 encases inner portion 78 and generally protects hose 12 from abrasion and impact. The inner layer 78 of cover 74 may be manufactured from a suitable flexible elastomeric material and sheath 76 may be manufactured from a high density polyethylene, for example. In an exemplary embodiment, hose 12 could be a hydraulic reinforced hose product manufactured and branded "ToughGuard™" by the assignee of the present application. Alternatively, the present invention hose coupling assembly contemplates compatibility with other suitable reinforced hose alternatives.

Coupling assembly 10 may be introduced to hose 12 by hand with little effort and without the need for additional tools, jigs or fixtures. Pilot land 44 of stem 16 is constructed to slightly interfere with an engagement portion 82 of the hose 12 while other portions of stem 16 are clearanced relative to the inside diameter of the hose 12 for ease of assembly and to ensure hose 12 is properly piloted on the coupling assembly 10 in preparation for the swaging operation. Clearance 80 is provided between the inner wall 68 of the hose 12 relative to nipple 32 and first and second lands 34, 36 of stem 16 in order for an assembler to mount the hose 12 on stem 16 with minimal effort.

Referring to FIG. 3, barb 60 will now be described. Barb 60 includes height, h, a base 94 defined by a width, $W_{base}$ and a tip 90 defined by a tip width, $W_{tip}$. Barb 60 extends the entire inner perimeter of inner wall 64 of shell 18 and its tip 90 includes first and second annular edges 86, 88. It may be seen that an annular opening 92 is created in cover 74 at the site of base 94 of barb 60 when the coupling assembly 10 undergoes swaging. Opening 92 in sheath 76 of cover 74 was created by tip 90 of barb 60 as it penetrated cover 74 during the swaging process, thus, eliminating the need for removing the cover—a process commonly referred to "skiving" the hose prior to the swaging operation. It is envisioned that barbs 58 and 62 (FIG. 2) are of similar construct and similarly engage hose 12 as has been described relative to barb 60.

Stem 16 includes annular groove 40 having a bottom 100, first and second walls 102, 104 connected to bottom 100 and first and second shoulders 106, 108 respectively connecting walls 102, 104 to first and second lands 34, 36. First and second walls 102, 104 are angled relative to an axially extending datum 105 that extends parallel relative to an axial centerline 107 of stem 16 (FIG. 2). In an exemplary embodiment, second wall 104 may be angled at 45 degrees relative to horizontal datum 105 and first wall 102 may be angled at 135 degrees relative to datum 105. Alternatively, it is envisioned that walls 102, 104 may be oriented from 90 degrees to other generally obtuse angles so as not to significantly affect sealing performance of the hose assembly 14. The width of groove 40 may be defined as $W_{groove}$ and is measured axially along stem 16 from the intersection of land 34 and first shoulder 106 to the intersection of land 36 and second shoulder 108. The depth, d of groove 40 may be measured along axial centerline 107 (FIG. 2) at the center of stem 16 beginning from horizontal datum 105 measuring axially to first land 34. Grooves 38 and 42 (FIG. 2) are of similar construct as has been described relative to groove 40.

Referring now to FIG. 2, it may be seen that each barb 58, 60 and 62 is generally centered relative to its respective groove 38, 40 and 42 and each is sized and spaced at a distance, S, from adjacent barb to create a controlled deflection and resultant seal force in the reinforcement wire 72 as will be described in further detail below. In contrast, the seal barb 63 includes a height, $h_s$, width, $W_{sbase}$, and tip width, $W_{stip}$ and lacks a corresponding groove as compared to barbs 58, 60 and 62.

Figure 4:
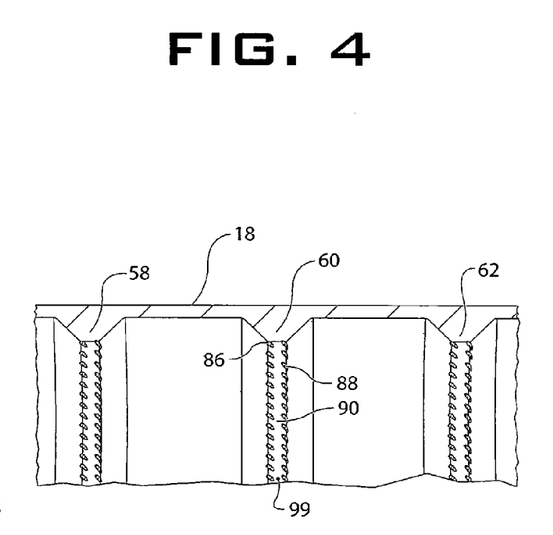
FIG. 4 is an enlarged view of the inner portion of the shell along line 4-4 of FIG. 2, with the hose removed, showing post-swage etching imparted by the hose reinforcement wire on the edge portions of the barbs.
Figure 5:
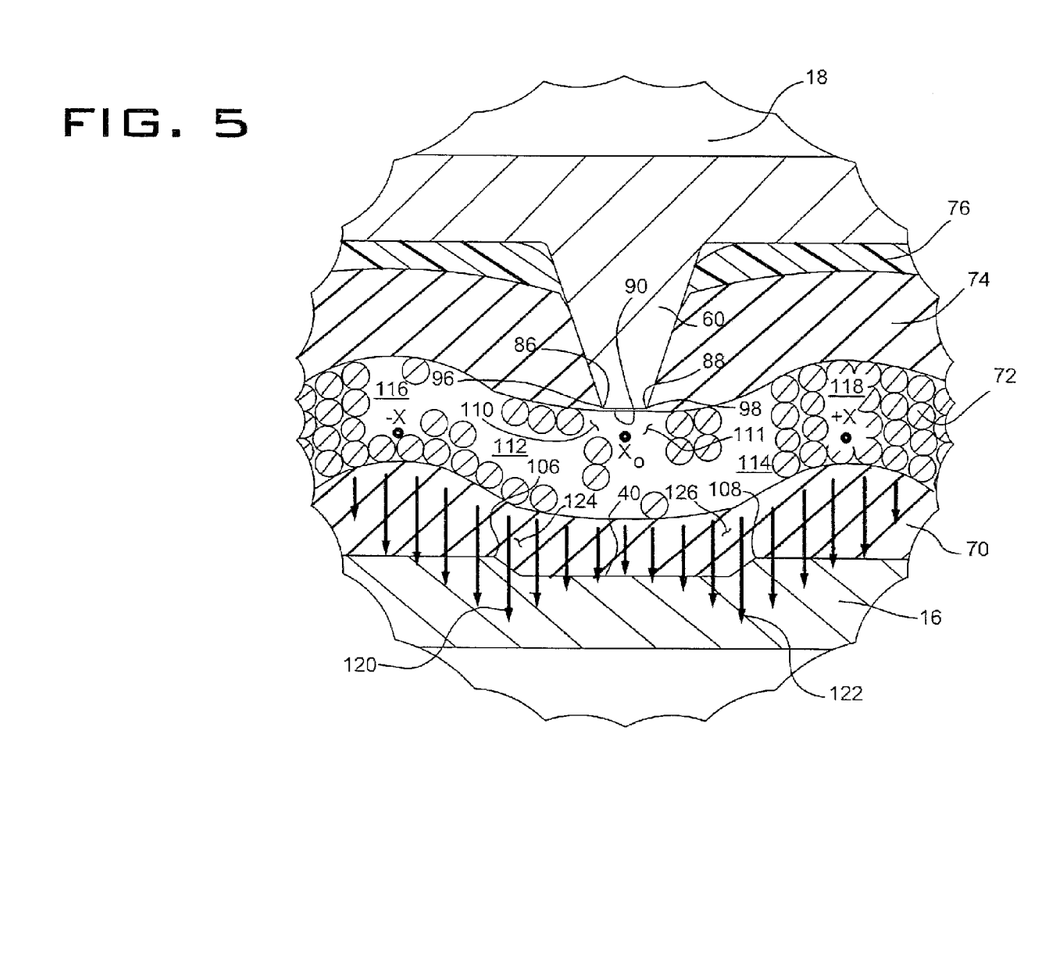
FIG. 5 is an enlarged view of the encircled area 3 of FIG. 2, showing the force distribution along the distance −X to +X, imparted by the hose reinforcement wire on inner portions of the hose.

Referring to FIG. 5, the controlled deflection of reinforcement wire 72 and resultant seal force imparted on liner 70 will now be described. It may be seen that after shell 18 is permanently deformed through the swaging process, compression regions 110 and 111 develop in reinforcement wire 72 in the vicinity of first and second edges 86, 88 of barb 60 corresponding to the reinforcement wire 72 being slightly deformed annularly along two distinct perimeters, first engagement portion 96 and second engagement portion 98 of reinforcement wire 72. In fact, as best seen in FIG. 4 depicting a disassembled and sectioned shell 18 that had undergone swaging, permanent deformation is observed in edges 86, 88 of barb 60 as a result of engagement of barb tip 90 with engagement portions 96, 98 of wire 72. In contrast, little if any deformation occurred along a center portion 99 of barb tip 90 (FIG. 4), meaning the force transferred by the barb 60 after shell 18 has been swaged was through two edges 86, 88 of barb 60 to form two annular seals between liner 70 and stem 16 (as is described in detail below) and not through a single center portion 99 (FIG. 4) of barb as is the case with prior art hose assemblies.

Referring again to FIG. 5, reinforcement wire 72 includes first and second deflection regions 112, 114 which correspond to portions of the reinforcement wire that are located outside of and adjacent compression regions 110, 111. The deflection of reinforcement wire 72 within deflection regions 112, 114 generates localized loading 120, 122 acting along two annularly positioned bands 124 and 126 in the liner 70 at a position in the liner 70 in the vicinity of first and second shoulders 106, 108 of stem 16. The loads 120, 122 generated by the reinforcement wire 72 act to compress the liner 70 in the regions 124, 126 of liner 70 which, in turn, compresses the liner 70 in the vicinity of shoulders 106, 108 to provide a resilient seal between liner 70 and stem 16. Located adjacent deflection regions 112, 114 in reinforcement wire 72 are cantilevered regions 116, 118 that respectively cantilever or extend beyond shoulders 106, 108 of groove 40 within stem 16. By allowing the reinforcement wire to cantilever significantly beyond the shoulders 106, 108 of groove 40 through control of barb distance, S, the deflection in deflection regions 112, 114 is preserved and, in turn, the loads 120, 122 generated by the deflecting reinforcement wire are not negatively impacted by adjacent barbs. It is envisioned that barbs 58 and 62 (FIG. 2) and corresponding grooves 38 and 42 within stem 16 are of similar construct and similarly engage reinforcement wire 72 and liner 70 of hose 12 to form seals between liner 70 and stem 16 as has been described relative to barb 60 and its corresponding groove 40.

Industrial Applicability

Referring to FIG. 1, to assemble coupling assembly 10 with hose 12 to form hose assembly 14 (FIG. 2) an assembler may grasp and advance hose 12 in order for end 46 of hose 12 to engage nipple 32 of stem 16 until end 46 of hose 12 abuts stop 45 on stem 16. The slight interference fit between pilot land 44 and engagement portion 82 of flexible hose 12, during this step, may be easily managed by hand and preferably without the need for tools or jigs. The pilot land 44 acts to ensure accurate placement and positioning of hose 12 relative to coupling assembly 10 in preparation for the swaging operation. The swaging operation may be accomplished by placing the aforesaid coupling assembly 10 and hose 12 combination in a suitable die 142 (FIG. 7) within a hydraulic crimping apparatus 128 (FIG. 7) to create a suitable swage diameter, $D_{shell}$ of shell 18 (FIG. 2) from a range of acceptable swage diameters (see Tables 3 and 4). Although various press and die products are commercially available, an exemplary press and die combination, such as a Crimputer II, Version 5 with appropriate dies is commercially available from the assignee of the present application and is suited to swage shell 18 to stem 16 to form coupling assembly 10. It will be appreciated by those with skill in the art of coupling manufacture that the present invention enables a range of values for $D_{shell}$ to be developed for each nominal size and type of coupling assembly 10. Further, it should be understood that prior to the swaging operation, the outer features ($D_{shell}$) for each shell for each size coupling will vary requiring post-swage ranges for these outer features to be empirically developed for each specific coupling assembly.

Referring to FIG. 5, in operation, it may be seen that after shell 18 is permanently deformed through the swaging process, compression regions 110 and 111 develop in reinforcement wire 72 in the vicinity of first and second edges 86, 88 of barb 60 corresponding to the reinforcement wire 72 being slightly deformed annularly along two distinct perimeters, first engagement portion 96 and second engagement portion 98 of reinforcement wire 72. Reinforcement wire 72 includes first and second deflection regions 112, 114 which correspond to portions of the reinforcement wire 72 that are located adjacent compression regions 110, 111. The deflection of reinforcement wire 72 within deflection regions 112, 114 generates localized loading 120, 122 acting along two annularly positioned bands 124 and 126 in the liner 70 at a position in the liner 70 in the vicinity of first and second shoulders 106, 108 of stem 16. The loads 120, 122 generated by the reinforcement wire 72 act to compress the liner 70 in the regions 124, 126 of liner 70 which, in turn, compresses the liner 70 in the vicinity of shoulders 106, 108 to provide a sustainable seal between liner 70 and stem 16. Located adjacent deflection regions 112, 114 in reinforcement wire 72 are cantilevered regions 116, 118 that respectively cantilever or extend beyond shoulders 106, 108 of groove 40 within stem 16. By allowing the reinforcement wire to cantilever significantly beyond the shoulders 106, 108 of groove 40 through control of barb distance, S (FIG. 2), the deflection in deflection regions 112, 114 is preserved and, in turn, the loads 120, 122 generated by the deflecting reinforcement wire 72 are not negatively impacted by deformed reinforcement wire 72 associated with adjacent barbs 58, 62.

It will be understood that the loads generated by reinforcement wire 72 at cantilevered positions −X and +X which correspond to locations 116, 118 within reinforcement wire 72 are relatively smaller than the loads 120, 122 generated at deflection points 112, 114 corresponding to positions in reinforcement wire 72 located overlaying shoulders 106, 108 of stem 16. Similarly, the load generated by reinforcement wire 72 at compression location $X_0$ is relatively smaller than the loads generated at deflection points 112, 114 corresponding to positions in reinforcement wire 72 located overlaying shoulders 106, 108 of stem 16. Therefore, loads 120, 122 generated by the reinforcement wire 72 in deflection locations 112, 114 act to compress the liner 70 in the circumferential regions 124, 126 of liner 70 which, in turn, compresses the liner 70 in the vicinity of shoulders 106, 108 to provide two distinct annular sealing bands between liner 70 and stem 16. In so doing, the barbs 56, 58 60 and corresponding shoulders 106, 108 of respective grooves 38, 40 and 42 are sized to promote the proper degree of deflection in reinforcement wire 72 to cause liner 70 to be resiliently compressed by the reinforcement wire 72 along a pair of annular bands 124, 126 of liner 70 as opposed to prior art hose assemblies which often over-compress the liner at the barb tip resulting in leakage and shortened life of the hose assembly.

Figure 6:
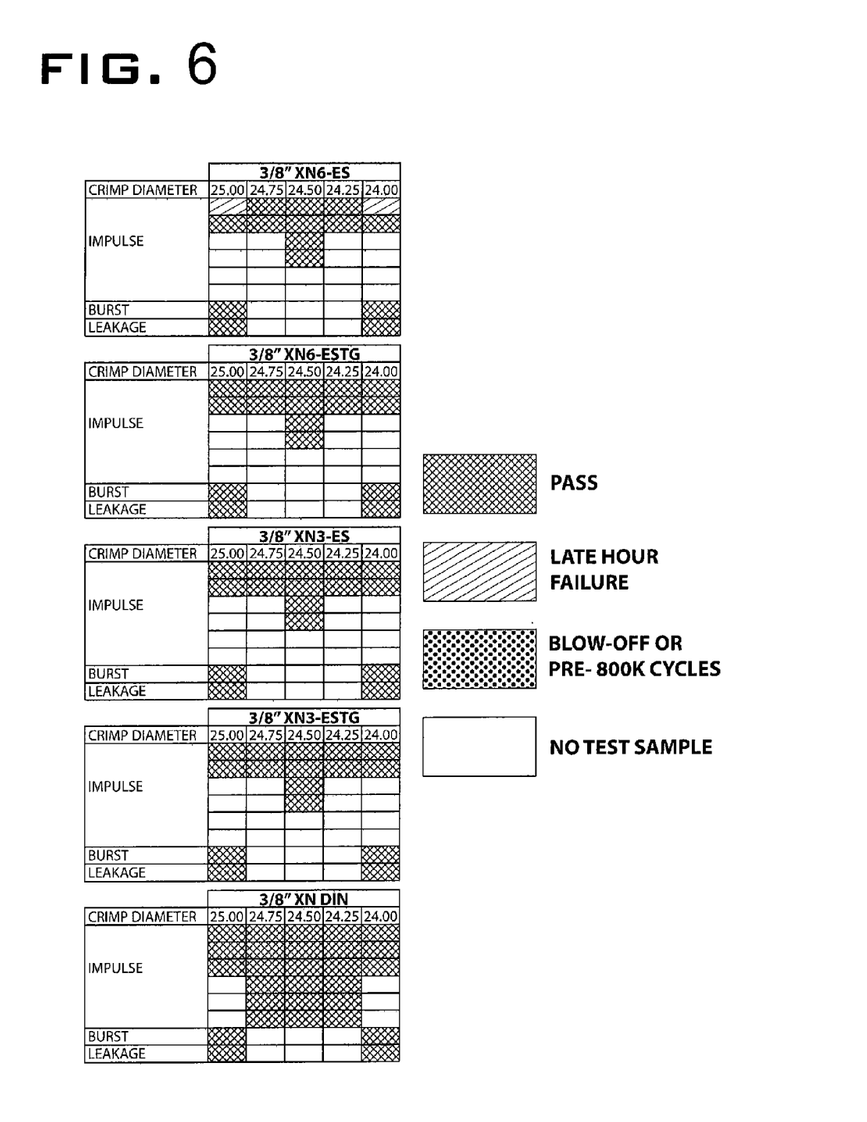
FIG. 6 are actual pressure test results (as a function of shell diameter, post-swage) for $\frac{3}{8}$" and $\frac{1}{2}$" diameter coupling assemblies and corresponding specified hose types using coupling configurations according to the present disclosure.

Referring now to FIG. 6, performance results for several variations of ⅜ and ½ inch nominal hose assemblies will be described. Impulse, leakage and bursts tests, according to Society of Automotive Engineering (SAE) Standard J343, were conducted for coupling assemblies constructed according to the present invention and were swaged in combination with a "XT" series hose, manufactured by Caterpillar Inc., to form the hose assembly test specimens. The test specimen hose assemblies are each identified by the letters "XN" however the nomenclature that proceeds these letters signifies the particular XT hose type as is set forth in FIG. 6. Each tested ⅜" and ½" hose assembly is shown in FIG. 6 and described as follows: (1) XN6 ES (6000 psi XT hose with no sheath), (2) XN6 ES ToughGuard (6000 psi XT hose with sheath), (3) XN3 ES (4000 psi XT hose with no sheath), and (4) XN3 ES ToughGuard (4000 psi XT hose with sheath).

Regarding the XN6 ES hose assembly using an XT6 ES hose for use with the ⅜" coupling assemblies, twenty-four hose assemblies in total were tested and of these, sixteen hose assemblies having the swage or crimp diameters for shell 18 ($D_{shell}$, FIGS. 2) of 24.75, 24.50 and 24.25 millimeter (mm) passed all three tests. The hose assemblies that had the smallest and largest crimp diameters (25.00 mm and 24.00 mm) failed the impulse test, however passed both the burst and leakage tests. It will be understood that a range of acceptable crimp diameters termed the "core crimp range" may include only those hose assemblies that passed all three tests or passed leakage and burst tests and experienced an impulse test failure after an extensive number of cycles. For example, a failure inside the core crimp range is allowable if the sample completes at least 800k cycles (80% of requirement) and the average of all the samples in the core crimp range is at least 1 million cycles (pass/fail requirement).

In summary, based on the test data, the acceptable range of crimp diameters or core crimp range for the XN6 ES hose assembly using the XT ES hose may be identified as 24.75 mm-24.25 mm diameters. It is suggested that a statistically adequate number of tests be executed for each crimp diameter for each hose assembly to ensure the repeatability and integrity of the data. Similar results for the remaining ⅜ inch hose assemblies 10 according to the present invention are shown in FIG. 6. It may be seen that although the hose type varied for each ⅜ inch hose assembly the coupling assemblies were substantially similar with the specific coupling assembly dimensions provided by Table 1 below.

Regarding the XN6 ES hose assembly using the XT6 ES hose for use with the ½" coupling assemblies, it may be seen that eight hose assemblies in total were tested and the specific couplings having the swage or crimp diameters for shell 18 ($D_{shell}$, FIGS. 2) of 29.00, 28.75, 28.50, 28.25 and 28.00 millimeter (mm) passed all three tests and were therefore considered candidates as core crimp range diameters.

In summary, based on the test data, the acceptable range of crimp diameters or core crimp range relating to the several ½ inch hose assemblies may be identified as 29.00 mm-28.00 mm. It is suggested that a statistically adequate number of tests be executed for each crimp diameter for each hose assembly to ensure the repeatability and integrity of the data. Similar results for the remaining ½ inch coupling assemblies 10 according to the present invention are shown in FIG. 6. It may be seen that although the hose type varied for each ½ inch hose assembly the coupling assemblies were substantially similar with the specific coupling assembly dimensions provided by Table 2 below.

The following tables provide exemplary information related to shell and stem dimensions for certain nominal size coupling assemblies.

TABLE 1

| Coupling Size (inch) | Shell and Stem Element | Dimension (mm) | Dimension Range (mm) |
|---|---|---|---|
| ⅜ | Barb width @ base ($W_{base}$) | 2.39 | 2.52-2.26 |
|  | Barb width @ tip ($W_{tip}$) | 0.71 | 0.84-0.58 |
|  | Height of barb (h) | 3.05 | 3.18-2.92 |
|  | Seal barb width @ tip ($W_{stip}$) | 1.17 | 1.30-1.04 |
|  | Height of seal barb ($h_s$) | 2.67 | 2.80-2.54 |
|  | Spacing of barbs (S) | 7.21 | 7.34-7.08 |
|  | I.D. of stem ($d_{stem}$) | 6.00 | 6.13-5.87 |
|  | O.D. of stem, nipple land (D1) | 9.52 | 9.65-9.39 |
|  | O.D. of stem, pilot land (D2) | 9.91 | 10.04-9.78 |
|  | Width of stem groove ($W_{groove}$) | 3.75 | 3.88-3.62 |
|  | Depth of stem groove (d) | 0.33 | 0.46-0.20 |

TABLE 2

| Coupling Size (inch) | Shell and Stem Element | Dimension (mm) | Dimension Range (mm) |
|---|---|---|---|
| ½ | Barb width @ base ($W_{base}$) | 2.49 | 2.62-2.36 |
|  | Barb width @ tip ($W_{tip}$) | 0.76 | 0.89-0.63 |
|  | Height of barb (h) | 3.23 | 3.36-3.10 |
|  | Seal barb width @ tip ($W_{stip}$) | 1.14 | 1.27-1.01 |
|  | Height of seal barb ($h_s$) | 2.84 | 2.97-2.71 |
|  | Spacing of barbs (S) | 7.44 | 7.57-7.31 |
|  | I.D. of stem ($d_{stem}$) | 8.50 | 8.63-8.37 |
|  | O.D. of stem, nipple land (D1) | 12.70 | 12.83-12.57 |
|  | O.D. of stem, pilot land (D2) | 13.08 | 13.21-12.95 |
|  | Width of stem groove ($W_{groove}$) | 3.75 | 3.88-3.62 |
|  | Depth of stem groove (d) | 0.33 | 0.46-0.20 |

Referring to FIG. 1, the crimping of shell 18 to stem 16 to form coupling assembly 10 will now be described. In an exemplary embodiment, both stem 16 and shell 18 are originally separate pieces and the stem may be machined from solid carbon steel bar stock using a computer numerically controlled machine or a screw machine; the shell 18 may be machined from a carbon steel extrusion on a machining center, for example. The inner portion 56 of shell 18, including barbs 58, 60, 62 and 63, may be machined in the same operation as female engagement portion 50 to ensure that shell 18 is substantially concentrically oriented relative to stem 16 in preparation for assembly with hose 12. Accordingly, the barb features ($W_{base}$, $W_{tip}$, $W_{sbase}$, $W_{stip}$ and $h_s$), the barb spacing (S), and the stem features ($d_{stem}$, D1, D2, $W_{groove}$ and d) may be machined prior to an operation where shell 18 is being permanently fused or joined to stem 16. The stem and shell may be annealed. For example, if the shell is manufactured from extruded carbon steel stock such as a 1010 or 1010 Ca steel and the stem is manufactured from a 12L14 or 1215 steel then the shell and stem may be annealed at 1900 degrees F. minimum resulting in a Rockwell B hardness reading within the range of 45 to 65. Annealing the stem and shell is necessary in preparation for attaching the stem to the shell and to ensure satisfactory swaging of the completed coupling assembly with hose. It will be understood that the pre-swage stem 16 and shell 18 dimensions may include a common tolerance for a majority of machined aspects of the stem and shell such as ±0.13 mm, for example.

Tool portion 52 of shell 18 may be a hexagonal shape in a finished condition to facilitate engagement by a tool (not shown) and be formed from a generally cylindrical shape in a "green condition" prior to the finish operation, through machining or preferably by a die forming operation such as a forging process, for example. Stem 16 and shell 18 may then be fused or permanently joined by a crimping operation by permanently deforming tool portion 52 of shell 18 to stem 16, using 6 die segments (not shown) in a press (not shown) structured to exert force in a circumferential manner on said dies, for example. Prior to fixing shell 18 with stem 16, nut 20 may be placed on stem 16. The tool portion 52 of shell 18 is located in the same vicinity as the joined combination of male and female engagement portions 48, 50 to consolidate functional features of shell 18 resulting in an appropriate sized shell 18 and corresponding stem 16 as compared to known coupling assemblies. The fusing of shell with stem may be carried out as taught by U.S Patent Application No. 2008/0185840, to Menor, filed Feb. 7, 2007 which is assigned to the assignee of the present application and is hereby incorporated herein by reference. The swaging of coupling assembly 10 with hose 12 to create a hose assembly may be carried out as taught by U.S. Pat. No. 5,799,383, issued to Baldwin et al., Sep. 1, 1998 which is assigned to the assignee of the present application and is hereby incorporated herein by reference.

Figure 7:
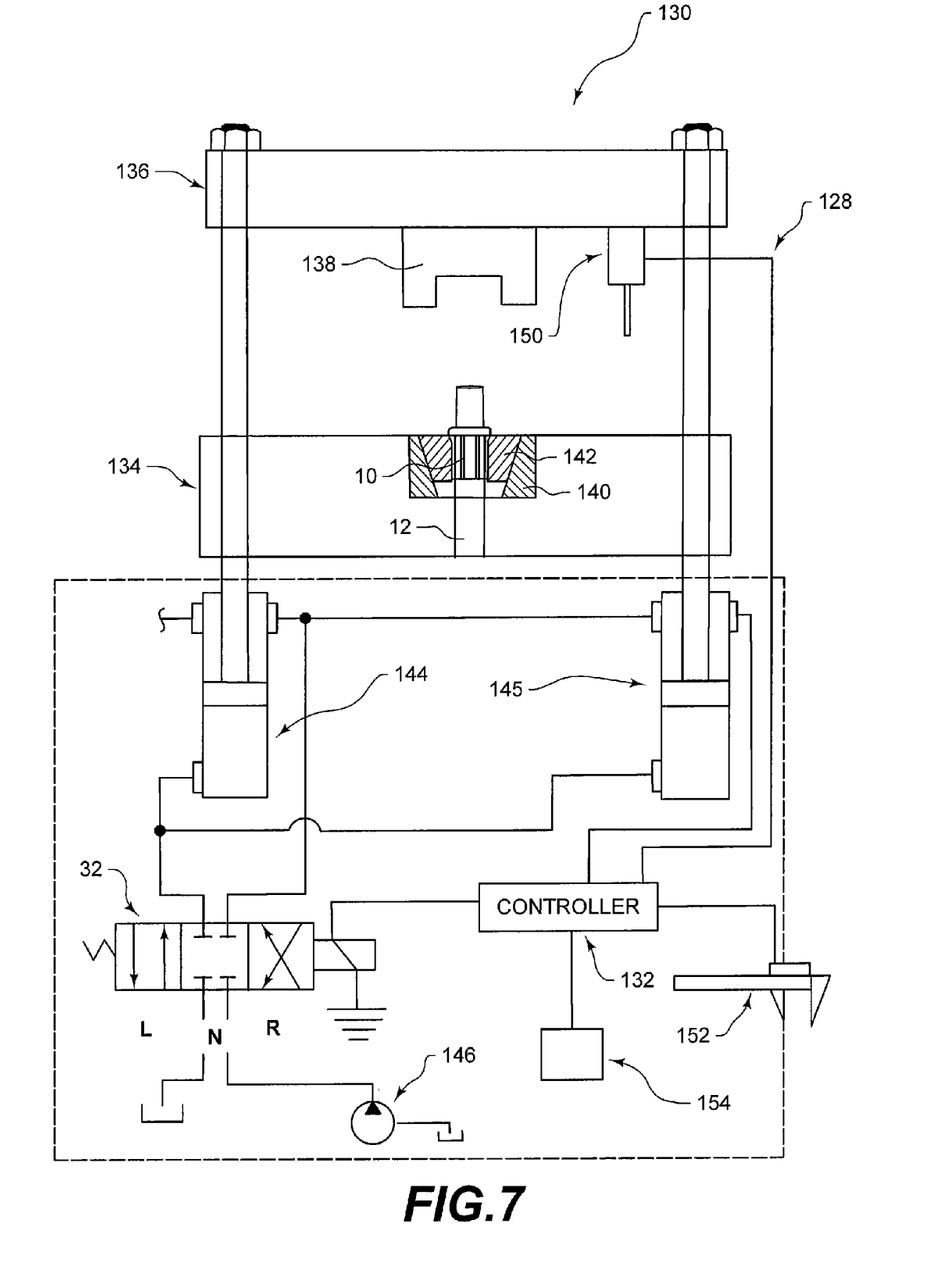
FIG. 7 is a diagrammatic schematic of a hose assembly crimping apparatus in accordance with the present invention showing a clamping machine, controller and a measuring device.

The crimping of coupling assembly 10 to hose 12 to form a hose assembly 14, according to the present invention, will now be described. Referring to FIG. 7, a hose assembly crimping apparatus 128 for crimping a coupling assembly 10 on the end of hose 12 includes a clamping machine 130 and a controller 132. Clamping machine 130 has first and second portions 134, 136. While the following components of clamping machine 130 may be mounted on either first portion 134 or second portion 136, as shown herein, die fixture 138 is advantageously attached to second portion 136, a conical-shaped die holder 140 to first portion 134 and a conical-shaped split die 142 is mated to die holder 140. Hydraulic rams 144, 145 driven by hydraulic motor 146 are connected to first and second portions 134, 136 and cause second portion 136 to move relative to first portion 134 in response to operator input at hydraulic ram control valve 148. Die 142 and die holder 140 move vertically in response to the clamping or releasing movement of die fixture 138 through portions 134, 136 while die 142 moves also horizontally inside die holder 140 upon being compressed or uncompressed by die fixture 138.

A first measuring device 150, such as a linear potentiometer, is attached to second portion 136 of clamping machine 130 and electronically connected to controller 132. However, first measuring device 150 could be mounted on first portion 134 of clamping machine 130 if desired. First measuring device 150 delivers a signal to controller 132 representative of the linear distance between first and second portions 134, 136 of clamping machine 130. Controller 132 stops the relative movement between portions 134, 136 in response to a signal from first measuring device 150 once the signal reaches a predetermined setting corresponding to a particular hose 12 type and size. A second measuring device 152, such as a digital caliper as is well known in the industry, is operatively connected to controller 132 and reports measured diameters of crimped coupling assemblies 10 thereto, as is later described. Controller 132 compares the measured diameters to a database of predetermined nominal connector diameters and calculates a differential magnitude. If the differential magnitude is out-of-tolerance (e.g., not within the range provided by Table 3 for a ⅜" coupling), controller 132 adjusts the relative movement of first and second portions 134, 136 according to the die 142 type and the hose 12 size and type. A foot pedal device 154 signals the controller 132 to record an output from second measuring device 152. Controller 132 has a menu-driven set of operator communications, as is customary, for simplifying the crimping process.

Again, referring to FIG. 7, an operator of crimping apparatus 128 may be prompted by a user interface (not shown) as part of controller 132 to commence a crimping operation. The operator may then select from a menu of hose types and sizes. The operator may then be instructed to install a particular die 142 into die holder 140 being based upon the selection. The operator then calibrates the relative vertical positions of first and second portions 134, 136 of clamping machine 130 by lowering second portion 136 until die fixture 138 seats upon first portion 134 and die holder 140.

After raising second portion 136 the operator installs a particular die or die group 142 into die holder 140 based upon the hose 12 type and size. The operator next inserts hose 12 and coupling assembly 10 into die group 142. The operator lowers second portion 136 of clamping machine 130 by moving lever (not shown) to activate hydraulic ram control valve 148. The lowering of second portion 136 is stopped by controller 132 at a predetermined setting, which is a function of type and size of hose 12. Since the diameter, $D_{shell}$ (FIG. 2) of shell 18 is derived—accessed via the controller's memory— once the linear distance of the die fixture 138 is measured during the crimping operation, the compressing of $D_{shell}$ to the final diameter may be stopped in response to a signal from the linear potentiometer 150 which is operatively connected to the controller 132. It is envisioned that second measuring device 152 may be an electronic caliper and be incorporated into crimping apparatus 128 as may be contemplated by those of ordinary skill; perhaps embedded into first portion 136 of clamping machine 130 to take direct electronic measurements of crimped shell diameter $D_{shell}$ and communicate the same to controller 132. Yet another alternative may be to manually apply electronic caliper 152 to measure shell diameter and communicate (e.g., key-in) the same to controller for the purpose of verifying that shell diameter, $D_{shell}$, is within a prescribed range, examples of which may be seen in Tables 3 and 4. It will be understood that the present invention provides a coupling assembly construct and associated manufacturing method that provides a range of acceptable shell diameters for ease of manufacture and assembly and to reduce incidences of scrap.

The operator then raises second portion 136 of clamping machine 130 and removes hose assembly 14 consisting of coupling assembly 10 permanently fixed with hose 12. Prior to removing finished hose assembly 14, operator may be prompted by controller 132 to measure the crimped coupling assembly 10. If operator chooses "no", controller 132 may then prompt operator to decide whether another coupling assembly 10 and hose 12 pair of identical size and type is to be crimped.

If the operator answers "yes" to measure the crimped coupling assembly 10 of the hose assembly 14 the operator may be prompted by controller 132 to decide whether the crimped measurements should be recorded by measuring device 152 such as a digital or electronic caliper, for example. If the operator answers "yes", the controller may initiate measuring sequence by calibrating the digital caliper 152. Calibration is performed by adjusting the digital caliper 152 to read "zero" when closed. Measurements may be manually taken with digital caliper 152 at $D_{shell}$ and then input by operator into the controller 132. Alternatively, crimping apparatus 128 may have digital caliper 152 or any alternative measuring device with electronic output incorporated into crimping apparatus

128. Measurements are taken from the outer diameter, $D_{shell}$, of crimped shell 18 of coupling assembly 10 and communicated to controller 132. More than one measurement may be taken, such as four, and then averaged to calculate the final value of the crimped shell 18. The controller 132 may then present this value through an electronic output of controller, as is customary, for operator to acknowledge. The measurements are then entered into the controller 132 and stored in memory as is customary for comparison with acceptable predetermined values within acceptable ranges as set forth in Tables 3 and 4, for example.

The operator may then be notified by the controller 132 whether the crimped value is within the predetermined acceptable range. If the crimp value is not within an acceptable range the controller 132 initiates adjustment of vertical travel of second portion 136 of clamping machine 130 in accordance with predetermined nominal diameter relationships programmed into the memory of controller 132 and corresponding to particular dies 142 and hose 12 types and sizes to maintain the crimped diameters within the acceptable predetermined range.

In summary, coupling assembly 10 is crimped onto the end of hose 12 and the diameter, $D_{shell}$ of crimped coupling assembly 10 is automatically maintained within the acceptable range. This is done by inputting controller 132 of hose assembly crimping apparatus 128 with the relative limit distance between first and second portions 134, 136 of the clamping machine 130; assembling coupling assembly 10 and end of hose 12 in the conical-shaped die 142 of the clamping machine 130 in preparation for crimping; and operating the clamping machine 130 so that the first and second portions 134, 136 move towards each other thereby compressing the conical-shaped die 142, the compressing action being stopped in response to a signal from the linear potentiometer 150 which is operatively connected to the controller 132.

The following tables provide exemplary information related to post swage shell dimensions $D_{shell}$ for certain nominal size hose assemblies.

TABLE 3

| Hose Assembly Size (inch) | Shell Element | Dimension (mm) | Dimension Range (mm) |
|---|---|---|---|
| ⅜ | Post swage diameter of shell ($D_{shell}$) | 24.50 | 24.75-24.25 |

TABLE 4

| Hose Assembly Size (inch) | Shell Element | Dimension (mm) | Dimension Range (mm) |
|---|---|---|---|
| ½ | Post swage diameter of shell ($D_{shell}$) | 28.50 | 29.00-28.00 |

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A coupling assembly for use with a wire-reinforced elastomeric hose member having reinforcement wire surrounding an elastomeric liner therein, the coupling assembly comprising:

a stem defining at least one groove, said at least one groove including first and second walls, a bottom portion and a pair of shoulder portions separated by a width; and a shell at least partially enclosing said stem with a first end engaging the stem and a second end having a shell opening receiving a hose end of the elastomeric hose member, and defining at least one barb, said at least one barb having a barb height, corresponding to one of the at least one grooves and including a tip portion defining first and second edge portions, said tip portion of said at least one barb being sized relative to said shoulder portions of said at least one groove to transfer force developed by deflection of the reinforcement wire to sealingly compress the liner of the hose between said shoulder portions of said at least one groove and said edge portions of said tip portion of said at least one barb corresponding to a swaged state of said shell and stem relative said elastomeric hose member, wherein the at least one barb is not radially aligned with the corresponding at least one grieve when the shell is in a non-swaged state, and the at least one bar is radially aligned with the corresponding at least one groove when the shell is in the swaged state and the shell further defining a seal barb having a seal barb height that is less than the barb height of the at least one barb, the seal barb being disposed proximate the shell opening with the at least one barb disposed between the seal barb and the first end of the shell, and wherein the seal barb lacks a corresponding groove of the stem and sealingly compresses the elastomeric hose member against a nipple portion of the stem when the shell is in the swaged state.

2. The coupling assembly of claim 1, wherein said coupling assembly further comprises one of a first set of coupling assembly dimensions comprising a coupling size of ⅜ inch, a barb tip width in the range of 0.58-0.84 mm, a barb height in the range of 2.92-3.18 mm, a barb spacing in the range of 7.08-7.34 mm, a groove width in the range of 3.62-3.88 mm, a groove depth in the range of 0.20 to 0.46 mm, and a second set of coupling assembly dimensions comprising a coupling size of ½ inch, a barb tip width in the range of 0.63-0.89 mm, a barb height in the range of 3.10-3.36 mm, a barb spacing in the range of 7.31 to 7.57 mm, a groove width in the range of 3.62-3.88 mm, a groove depth in the range of 0.20 to 0.46 mm.

3. The coupling assembly of claim 1, wherein the first end of said shell includes a tool portion defined on an outer surface thereof and a female engagement portion defined on an inner portion of said shell, said female portion of said shell being engaged with a male engagement portion defined by said stem, said tool portion of said shell generally overlaying said female engagement portion of said shell and axially spaced relative said male engagement portion of said stem.

4. The coupling assembly of claim 3, wherein said tool portion of said shell is hexagonal.

5. The coupling assembly of claim 1, wherein the stem includes a first end defining a sealing interface disposed thereon and a nut positioned relative said sealing interface structured and arranged to sealably secure said first end of stem.

6. The coupling assembly of claim 5, wherein said nut is rotatable relative said first end of said stem.

7. The coupling assembly of claim 1, wherein the wire-reinforced elastomeric hose member has an inner surface having an inner diameter, wherein said nipple portion includes a land having an outer diameter and said stem includes a pilot land, said land on said nipple and said pilot land being axially spaced, wherein the outer diameter of the land is dimensioned to dispose a radial clearance between said land on said nipple and said inner surface of the hose in a non-swaged state of said shell and stem members.

8. The coupling assembly of claim 7, wherein said coupling assembly further comprises one of a first set of coupling assembly dimensions comprising a seal barb tip width in the range of 1.04-1.30 and a seal barb height in the range of 2.54-2.80, and a second set of coupling assembly dimensions comprising a seal barb tip width in the range of 1.01-1.27 and a seal barb height in the range of 2.71-2.97.

9. The coupling assembly of claim 8, wherein said first set of coupling assembly dimensions comprises a nipple land outer diameter in the range of 9.39-9.65 mm and a pilot land outer diameter in the range of 9.78-10.04 mm, and said second set of coupling assembly dimensions comprises a nipple land outer diameter in the range of 12.57-12.83 mm and a pilot land outer diameter in the range of 12.95-13.21 mm.

* * * * *

UNITED STATES PATENT AND TRADEMARK OFFICE
CERTIFICATE OF CORRECTION

PATENT NO. : 8,888,141 B2  
APPLICATION NO. : 12/609525  
DATED : November 18, 2014  
INVENTOR(S) : Eric D. Menor Page 1 of 1

It is certified that error appears in the above-identified patent and that said Letters Patent is hereby corrected as shown below:

In the specification

Column 7, line 55, delete "Industrial Applicability" and insert -- INDUSTRIAL APPLICABILITY --.

Column 11, line 18, delete "U.S" and insert -- U.S. --.

Signed and Sealed this
Twenty-fourth Day of November, 2015

Michelle K. Lee
*Director of the United States Patent and Trademark Office*